United States Patent [19]

Kent et al.

[11] 4,181,468

[45] Jan. 1, 1980

[54] GEOTHERMAL ENERGY PUMP MONITOR AND TELEMETRIC SYSTEM

[75] Inventors: William H. Kent, Westford; Anthony P. Nardi, Burlington, both of Mass.

[73] Assignee: Sperry Rand Corporation, New York, N.Y.

[21] Appl. No.: 884,794

[22] Filed: Mar. 9, 1978

[51] Int. Cl.² .................. F04B 17/06; F04B 21/00
[52] U.S. Cl. ..................... 417/63; 417/379; 60/641
[58] Field of Search ............. 60/641; 417/63, 379

[56] References Cited

U.S. PATENT DOCUMENTS

| 2,577,559 | 12/1951 | Armstrong | 417/63 X |
| 3,248,938 | 5/1966 | Hill | 417/63 X |

*Primary Examiner*—Allen M. Ostrager
*Attorney, Agent, or Firm*—Howard P. Terry

[57] ABSTRACT

The operation of a geothermal well power-generation-system is monitored by sensor, communication, and performance monitoring equipment normally associated integrally with the operating power generation system. Sensors detect magnitudes of well water temperature, of water pressure below and above the pump, and of other parameters of interest deep in the well. This data is transmitted by multiplex communication via a novel two-wire line telemetric system to receiver and utilization means at the earth's surface. Power for excitation of deep well monitor units is supplied from the earth's surface also by the two-wire telemetric system. A configuration involving a mechanically separable transformer disposed serially within the two-wire line aids installation of the monitor system and its removal in the rare event that it is required to remove the entire pump from its operating deep well site.

25 Claims, 7 Drawing Figures

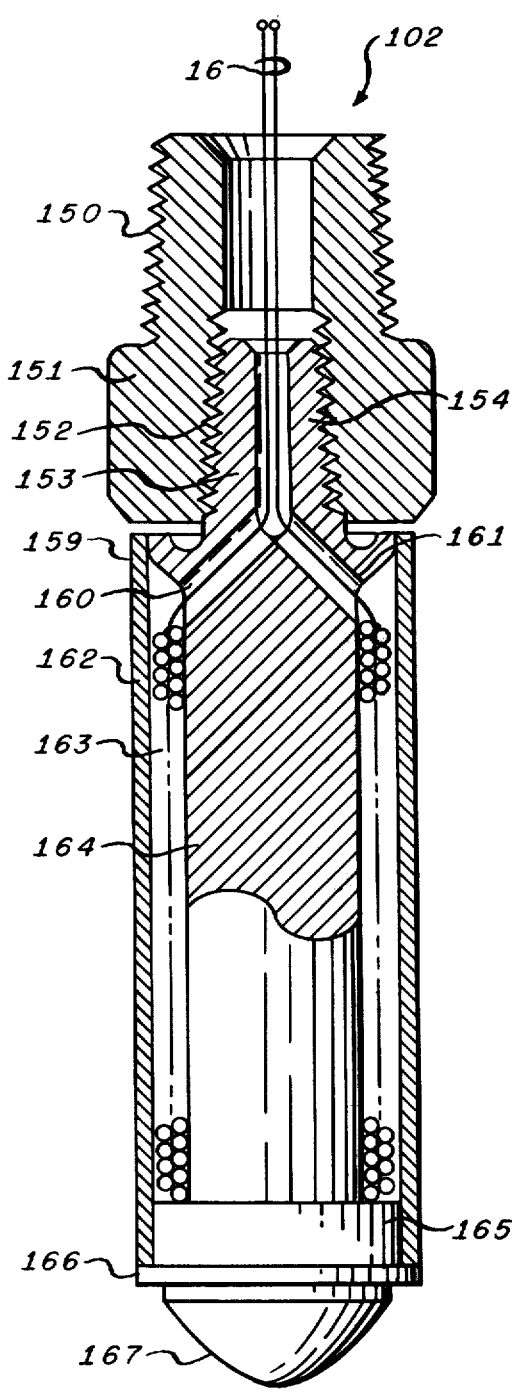
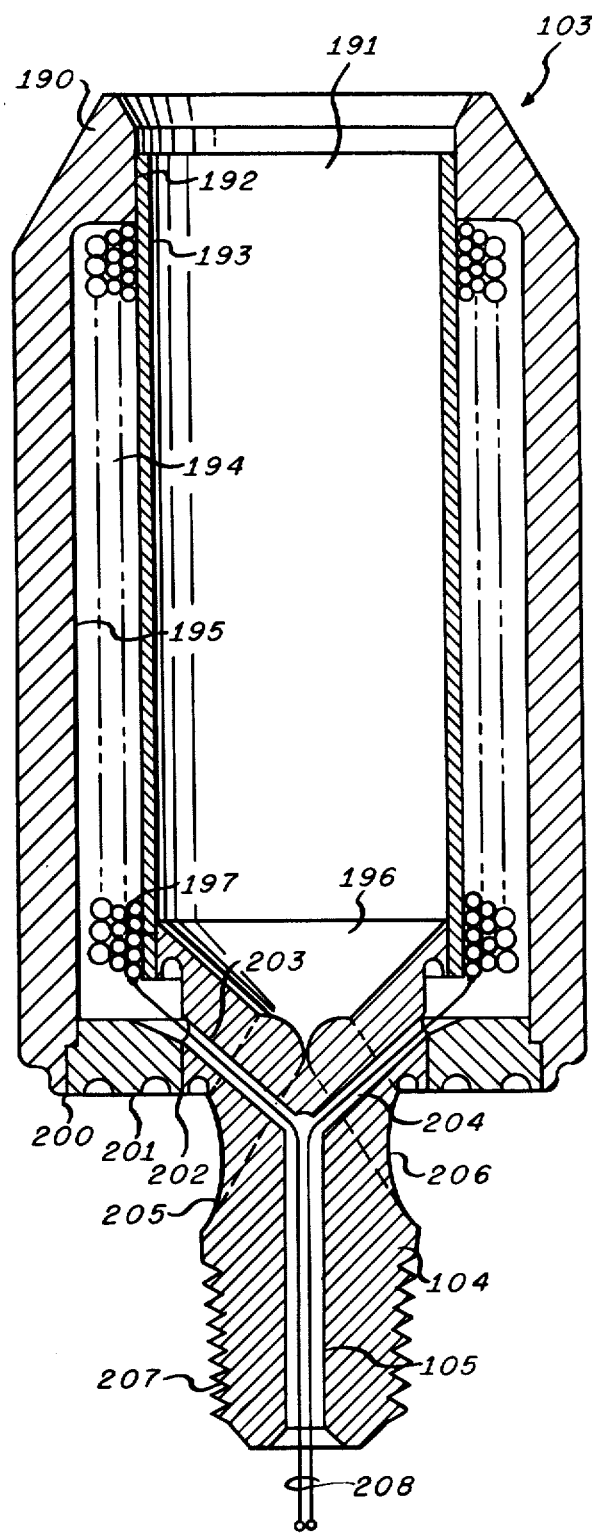
FIG.3.
FIG.4.

GEOTHERMAL ENERGY PUMP MONITOR AND TELEMETRIC SYSTEM

BACKGROUND OF THE INVENTION

1. Field of the Invention

The invention relates generally to measurement, communication, and performance-monitoring apparatus used in the installation and operation of geothermal well power systems of the kind providing for the generation of electrical power by utilizing energy from subterranean geothermal sources and, more particularly, relates to arrangements for monitoring the operation of such geothermal power systems including efficient superheated vapor generation and pumping equipment for application within deep hot water wells for the beneficial transfer of thermal energy to the earth's surface.

2. Description of the Prior Art

The present invention is designed for use in operating geothermal well power generation systems of the general kind further discussed herein, for example, that abstract thermal energy stored in hot solute-bearing well water to generate vapor, preferably superheated, from an injected flow of clean liquid; the superheated vapor is then used in operating a turbine-driven pump at the well bottom, pumping the hot-solute bearing water at high pressure and in liquid state to the earth's surface to effect transfer of its heat content to a closed-loop boiler-turbine-alternator combination for the generation of electrical power. Cooled, clean fluid is regenerated by the surface-located system for reinjection into the deep well and the solute-bearing water is pumped back into the earth.

Geothermal wells may be logged to a useful extent by methods applied previously in the oil well industry. In such tests, a canister which may contain sensors, a battery, and a recorder is lowered into the well and is then brought back to the earth's surface where the recorded data is retrieved. This time-consuming method is undesirable even in the oil well application, as it is not a real-time method and requires removal of pumping equipment from the well. Where an operating system such as a geothermal well pump is present, removal of the pump system cannot be considered on economic grounds and only secondary ways of finding out qualitatively what is occurring at the deep well pump site are available.

One prior art permanent monitoring method which has achieved significant success in geothermal well installations is taught in the H. B. Matthews U.S. Pat. No. 3,988,896, issued Nov. 2, 1976 for a "Geothermal Energy Pump and Monitor System" and assigned to Sperry Rand Corporation. Continuous monitoring of various parameters of the deep well system is permitted, including well water pressure and temperature immediately below the pump, the pressure increment across the pump, and the rotational speed of the pump, for example. Means are provided at the deep well pump location for generating electrical signals representative of well water pressure below and above the pump, of well water temperature below the pump, and of the rotational speed of the geothermal pump, these data being communicated to receiver and utilization means disposed at the earth's surface. A permanent magnet generator system supplies the signal representative of pump rotation speed, also providing electrical energy for the multiplexing and communication of the multiplexed signals. Conventional sensors may be employed, or improved bridge sensors such as disclosed by K. W. Robbins and G. F. Ross in the U.S. patent application Ser. No. 810,220, for a "Geothermal Well Pump Performance Sensing System and Monitor Therefor", filed June 27, 1977, issued Aug. 22, 1978 as U.S. Pat. No. 4,107,987 and assigned to Sperry Rand Corporation.

It will be understood by those skilled in the geothermal power generation art that a wide range of characteristics must be faced by the designer who approaches the geothermal well monitoring problem. Each well has its own particular characteristics and the design of its pumping system and its monitor must be compatible with such characteristics. In some circumstances, it is impossible or at least not convenient to use the down-well generator of the aforementioned U.S. Pat. No. 3,988,896 on the basis of space considerations. In other wells, where high-speed down-well systems are dictated, conditions are such that the balanced condition of the electrical generator may not survive for a reasonable life time.

SUMMARY OF THE INVENTION

The present invention relates to telemetric apparatus for monitoring, whether in operation or standby, the parameters associated with deep well geothermal pumps. Sensors at the deep well pump site detect magnitudes, for example, of well water temperature and pressure immediately below and above the pump and this data is transmitted by multiplex communication via a novel two-wire telemetric system to a receiver for use at the earth's surface. All power for excitation of the deep well monitor units is supplied from the earth's surface over the same two-wire data link, thus eliminating the need for generation of considerable electrical power at the down-well pump location. A novel cylindrically symmetric, mechanically separable transformer is connected in effect in series in the two-wire line system within a conduit system providing lubricant to the bearings of the turbine-motor-pump unit. The transformer configuration aids in the ready installation of the deep well pump system, and its removal from the well in the event that such a requirement arises, by eliminating the multitude of electrical connections required by an integrally wired down-well measurement and telemetry system.

BRIEF DESCRIPTION OF THE DRAWINGS

FIGS. 3 and 4 are cross-section views of the novel separable transformer 102, 103 of FIG. 2.

DESCRIPTION OF THE PREFERRED EMBODIMENTS

Figure 1:
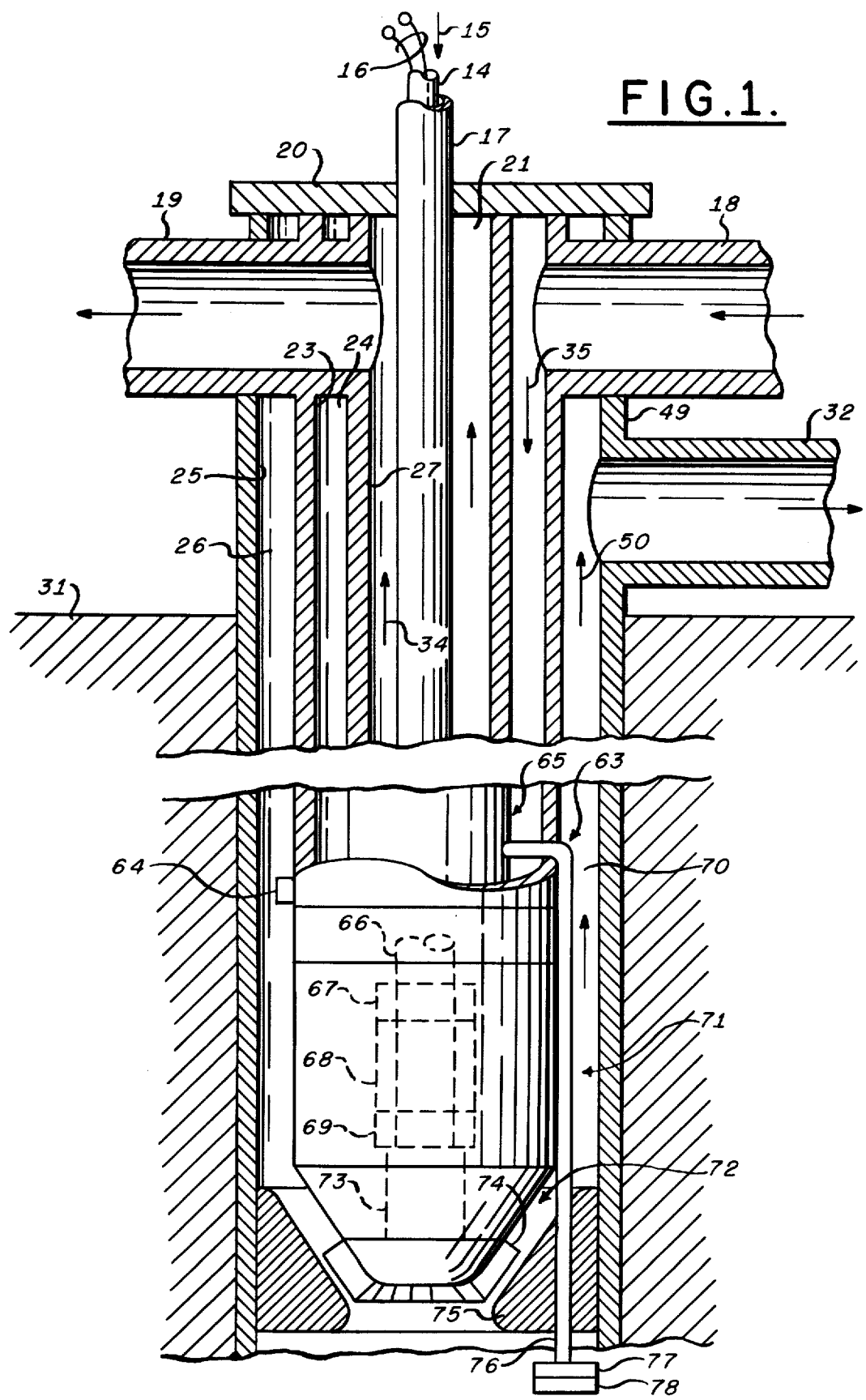
FIG. 1 is an elevation view, mostly in cross-section, of a deep well geothermal pump showing the general disposition of the novel monitor system.

FIG. 1 illustrates the general structural characteristics of that portion of one type of geothermal energy extraction system which is immersed in a deep well extending into strata far below the surface of the earth, preferably being located at a depth such that a copious supply of extremely hot geothermal water under high pressure is naturally available, the active pumping structure being located adjacent the water source and within a generally conventional well casing pipe 25. The configuration in FIG. 1 is seen to include a well head section 20 normally located above the earth's surface 31 and a main well section 49 extending downward from well head section 20 and below the earth's surface 31. At the subterranean source of hot, high pressure water, the main well section 49 joins a vapor generator section 63. The vapor generator section 63, the vapor motor turbine section 70, a rotary bearing section 71, and a hot water pumping section 72 follow in close cooperative succession at increasing depths. Interposed between the vapor generator section 63 and the vapor motor turbine section 70 is a section including measurement and communication elements for facilitating the monitoring function performed according to the present invention, a section identified as the instrumentation section 65, yet to be described in detail with the aid of FIGS. 2 through 5.

Extending downward from the well head section 20 at the earth's surface 31, the well casing pipe 25 surrounds in preferably concentric relation an innermost stainless steel or other high quality alloy steel pipe 17 for supplying relatively pure water under pressure from the earth's surface 31 at the bottom of the geothermal well, as indicated by arrow 15 and as will be further explained. A second relatively larger pipe 27 surrounding pipe 17 forms a conduit 21 within well casing 25, extending from well head 20 to the energy conversion and pumping system at the bottom of the well and permitting turbine exhaust vapor to flow upward to the surface of the earth as indicated by arrow 34.

It will also be understood from FIG. 1 that relatively clean and cold liquid, reformed at the earth's surface by condensing the vapor stream flowing up conduit 21 and the branching exit pipe 19, is reinjected by a second branching input pipe 18 into conduit 24 defined by the concentric pipes 23 and 27. This liquid flows downward as a working fluid in conduit 24 as indicated by arrow 35 to be converted into high pressure vapor for driving the vapor turbine of turbine section 70. The liquid employed may be pure water or a suitable organic fluid.

The function of the turbine located at section 70 and supported by shaft 66, 73 and bearings 67, 68 and 69 located within bearing section 71 is to drive a hot well water pump located at section 72. Hot, high pressure water or brine is thus impelled upwardly by the rotating pump vanes 74 between the rotating conical end of the pump and the associated stationary shroud 75. The hot water is pumped upward at a high velocity in annular conduit 26 between pipes 23 and 25, thus permitting use, for example, of the thermal energy it contains at the earth's surface by a power plant coupled to pipe 32. More important, the hot well water is pumped upward to the earth's surface 31 at a pressure preventing it from flashing into steam and thus undesirably depositing dissolved salts at any such point of flashing.

Accordingly, it is seen that the extremely hot, high-pressure geothermal well water is pumped upward, flowing in the annular conduit 26 defined by alloy pipes 23 and 25. Heat supplied by the hot well water readily converts the clean water flowing from conduit 24 into the steam generator at section 63 into highly energetic, dry, superheated steam. The clean water in conduit 24 is maintained at a very high pressure due to its hydrostatic head and to pressure added by a surface pump (not shown) so that it may not flash into steam. The highly energetic steam drives the steam turbine and shaft 66 and is redirected to flow upward to the earth's surface 31 after expansion as relatively cool steam flowing within the annular conduit 21 defined between alloy pipes 17 and 27. Thermal energy is recovered at the earth's surface 31 primarily from the hot, high pressure well water, but may also be retrieved from the turbine exhaust steam.

The elements of the FIG. 1 apparatus so far considered, with the exception of instrumentation section 65, are substantially similar to those of the following United States Patents assigned to Sperry Rand Corporation:

- H. B. Matthews U.S. Pat. No. 3,824,793, issued July 23, 1974 for "Geothermal Energy System and Method",
- H. B. Matthews U.S. Pat. No. 3,898,020, issued Aug. 5, 1975 for "Geothermal Energy System and Method",
- H. B. Matthews U.S. Pat. No. 3,938,334, issued Feb. 17, 1976 for "Improved Geothermal Energy Control System and Method",
- H. B. Matthews, K. E. Nichols U.S. Pat. No. 3,910,050, issued Oct. 7, 1975 for "Geothermal Energy System and Control Apparatus",
- J. L. Lobach U.S. Pat. No. 3,908,380, issued Sept. 30, 1975 for "Geothermal Energy Turbine and Well System", and
- R. Govindarajan, J. L. Lobach and K. E. Nichols U.S. Pat. No. 3,905,196, issued Sept. 16, 1975 for "Geothermal Energy Pump Thrust Balance Apparatus".

The invention is found equally suitable for application in a second type of geothermal energy extraction system of the type disclosed by H. B. Matthews in the U.S. patent application Ser. No. 860,270 for a "Geothermal Energy Conversion System", filed Dec. 13, 1977, issued Feb. 27, 1979 as U.S. Pat. No. 4,142,108 and also assigned to Sperry Rand Corporation. The latter system is a geothermal energy recovery system of reduced cost and improved efficiency that makes use of thermal energy stored in hot, solute-bearing well water during the period that it is pumped upward to the earth's surface through an extended lineal heat exchange element for continuously heating a downward flowing organic working fluid. The added energy of the latter fluid is then used within the well for operating a turbine-driven pump for pumping the hot, solute-bearing well water at high pressure and always in liquid state to the earth's surface, where it is reinjected into the earth by a sump well. The temperature difference between the upward flowing brine and the downward flowing organic working fluid is maintained finite in a predetermined manner along the length of the subterranean extended heat exchange element. After driving the deep well turbine-driven pump, the organic fluid arises to the earth's surface in a thermally insulated conduit; at the earth's surface, electrical power generation equipment is driven by the ascending organic fluid, after which it is returned into the well for reheating in a closed loop as it travels downward in the extended heat exchanger.

According to the present invention, the brine pump input pressure is measured by a conventional pressure sensor 77 located below the input shroud 75 of the geothermal pump, preferably at a location sufficiently below shroud 75 to avoid flow disturbances induced by operation of the pump. The measured pressure signals are preferably electrical signals conveyed by conductors in a corrosion immune tube 76 into the instrumentation section 65. Tube 76 or other conventional support elements may be mechanically sufficient to support pressure sensor 77, as well as an associated conventional temperature sensor 78, from which further electrical signals are supplied in a similar manner within instrumentation section 65. A further conventional pressure sensor 64 is mounted on pipe 23 and is used to provide electrical signals within instrumentation section 65 representing the magnitude of the pressure of the pumped well water between pipes 23 and 25 at a convenient location above the exhaust of pump section 72. Further signals representative of the rate of rotation of the pump shaft 66 and therefore of the turbine and geothermal fluid pump may be generated by a simple tachometer (not shown) of the type in which the pole of a magnet mounted somewhere on the rotating pump exterior structure passes a fixed coil once each revolution of shaft 66. Since the tachometer generator need generate only a low power level signal, the expense and design problems attendant a large power generator driven by shaft 66 are avoided. A simple configuration immune to the rigorous down-well conditions will easily be envisioned by those skilled in the art.

The two pressure representative signals, the temperature signal, and shaft speed or other signal are processed in a manner to be described with reference to FIG. 5 within the instrumentation section 65 wherein multiplexed signals are generated for propagation toward the earth's surface 31. Electric signals may thus be received at the earth's surface 31 for use in apparatus for display, recording, or control purposes.

Figure 2:
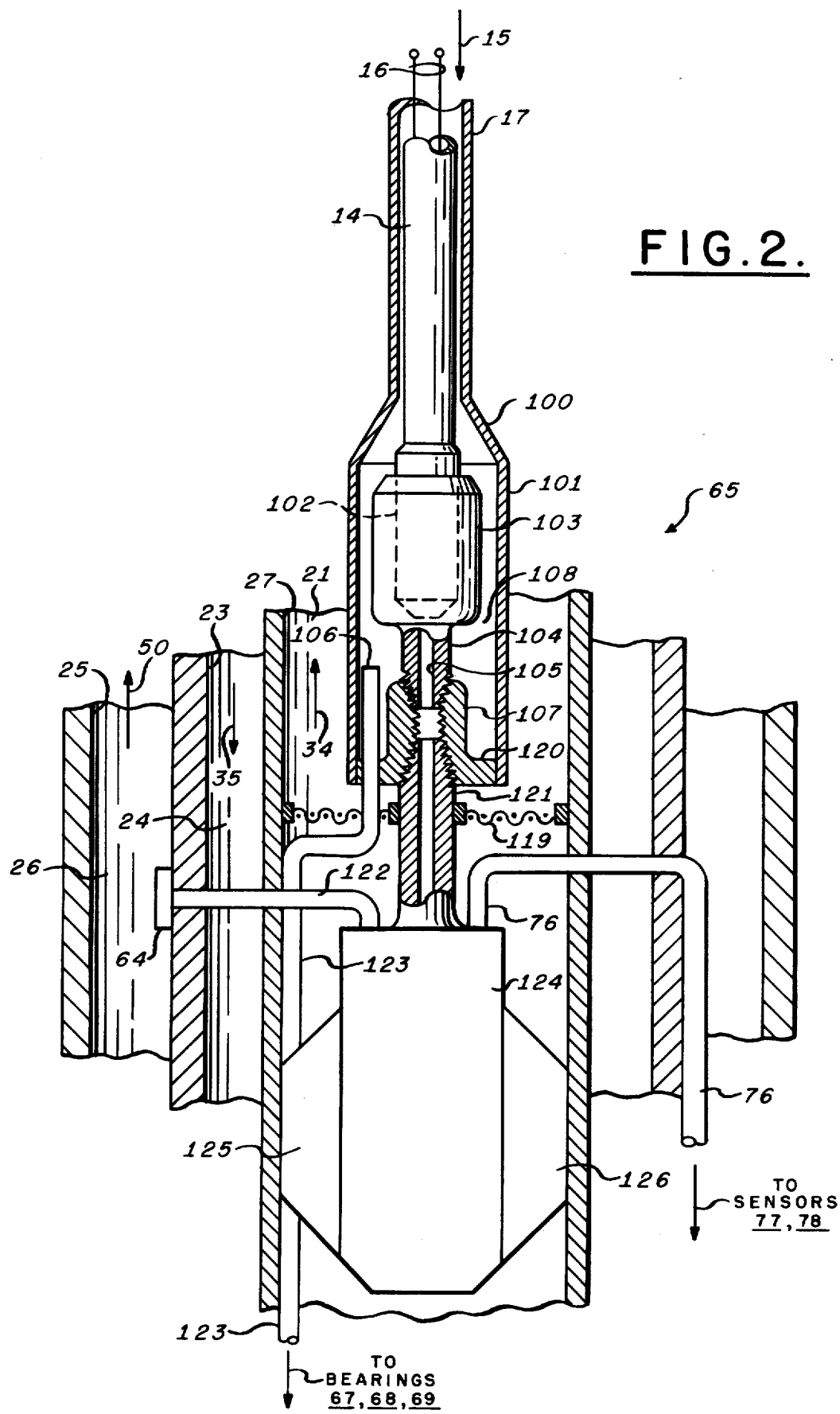
FIG. 2 is a cross-section of the instrumentation system of FIG. 1 on a somewhat larger scale and in greater detail.

The instrument section 65 is the major locus of the novel apparatus of the present invention; it is shown in greater detail in FIG. 2. As in FIG. 1, the instrumentation section 65 is located adjacent the deep well pump within the concentrically disposed pipes 27 and 23 and the outer well casing 25. More particularly, the principal elements of the instrumentation apparatus are supported axially within conduit 21 and are cooled within the rising and expanding vapor stream 34 as it is exhausted by the turbine of turbine section 70 of FIG. 1.

One function of the invention is to provide electrical connections to and from surface-located test equipment, as will be more particularly described in connection with FIGS. 5 and 6, and measurement apparatus permanently disposed in the instrumentation system 65. For this purpose, a hollow pipe 17, suspended from the well head plate 20, extends downward in the well to section 65. At the latter location, pipe 17 is expanded by the conical adapter 100 to support a larger diameter shell envelope 101 closed at its bottom end by end plate 120 welded to shell 101 so as to define a generally cylindric internal cavity 108. End plate 120 centrally supports a reentrant portion 107 equipped with a bore that is internally threaded. An upper threaded part of the bore cooperates with a threaded pipe 104 whose bore 105 extends upward into electrical transformer element 103.

Elements 102 and 103 cooperatively form separable windings of an electrical transformer, the lower element 103 thereof being supported on pipe 104, while the upper element thereof is supported by the downwardly extending tube 14. Tube 14 is concentric within pipe 17 and, like pipe 17, is normally supported at the well head 20. The internal diameter of pipe 17 is made slightly greater than the maximum outer diameter of transformer element 102 so that the latter may be lowered from the top of the well to the normal operating position shown in FIG. 2. Stainless steel tube 14 acts as a protective envelope for electrical leads 16, which may be supplied with suitable electrical insulating covers.

Just as the leads 16 couple to the winding of transformer element 102, at least a pair of electrical leads (not shown in FIG. 2) extend from the second transformer element 103 through bore 105, reentrant portion 107, and a bore in pipe 121 into the closed electronic circuit envelope 124. Cavity 108 also acts as a cavity reservoir for containing lubricating fluid under pressure for supply via tubes 106 and 123 to the turbine motor-pump bearings 67, 68, 69 (FIG. 1) in the manner indicated in the aforementioned U.S. Pat. No. 3,988,896. The bearings 67, 68, 69 are of a conventional nature with seals such that the lubricant fluid cannot leak out of the bearing system in any substantial amount; therefore, a large volume flow of lubricant into the bearings is not needed and the single space-saving small supply tube 123 is used to supply an adequate amount of lubricant for bearings 67, 68, 69. A bearing system with seals of the kind shown in the aforementioned patent application Ser. No. 860,270, may be employed in the present invention, for example.

The lubricant cavity 108 and the lower transformer element 103 are supported by the axially disposed pipe 121 at the top of electronic circuit envelope 124, the location of envelope 124 being determined by a plurality of radially disposed vanes such as vanes 125, 126 welded to envelope 124 and to the opposite inner wall of pipe 27. Vanes 125, 126 tend to augment the cooling of envelope 124 and its contents by the action of expanding vapor flowing in conduit 21 in the sense of arrow 34 away from the turbine motor located just below envelope 124. Between the bottom of transformer 102, 103 and the upper end of circuit envelope 124 is located a horizontal screen 119 adapted to collect debris which may fall into conduit 21 and which would otherwise damage or even destroy the turbine motor. Loose objects accidentally falling during installation of the apparatus are the objects of primary interest. FIG. 2 illustrates an electrical lead protecting tube 122 extending in sealed relation from electronic circuit envelope 124 through pipes 27 and 23 to sensor 64; it also again illustrates the electrical lead-protecting tube 76 also extending in sealed relation from the electronic circuit envelope 124 through pipes 27 and 23 downward to sensors 77, 78.

It is seen that, according to the invention, electrical power is always available at the location in the well of the instrumentation section 65, independent of the presence of a power source deep in the well, such as a generator driven by shaft 66. Thus, continuous monitoring of the condition of the well is afforded, whether or not the pump 72 is operating. The electrical leads 16 from the earth's surface to the instrumentation section 65 do not normally need to be removed except in the unusual situation in which the entire turbine motor and pumping apparatus is to be removed from the well.

As illustrated in FIG. 3, the upper or movable transformer element 102 of FIG. 2 is the terminus of leads 16 which extend downward from the earth's surface 31 through the supporting protective tube 14. As will be seen, the interiors of stainless steel tube 14 and transformer element 102 are normally supplied with a stable gas under sufficient pressure (FIG. 6) to prevent lubricant or other fluids from destructively leaking into these parts. The device of FIG. 3 consists of a cylindrical magnetic core having an enlarged end portion 165 with a generally conically shaped tip 167. The core 164 extends upward to a fastener portion 154 which is threaded at 152 and is supported by matching threads from coupler 151. Coupler 151 is, in turn, equipped with outer threads 150 which are used to fasten the assembly to the bottom threaded end of tube 14. A cylindric protective shell envelope 162 is welded at its ends 159 and 166 to core 164, forming an annular cavity within which is first wound the coil winding 163. The leads 16 pass through branching bores 160, 161 in the upper or fastener portion 153 of the core to join the opposite ends of the electrical conductor making up coil 163. Core 164 and its parts 151, 165, and 167 are composed of a conventional high permeability magnetic material such as an electrical nickel steel or an iron-chromium or other similar magnetic alloy of which many types are readily available on the market.

The lower or fixed transformer element 103 from which electrical leads 208 originate is shown in detail in FIG. 4. It is generated around an interior cylindric shell 193 whose inside diameter is just slightly greater than the outside diameter of the exterior shell 162 of the apparatus of FIG. 3 so that the upper transformer element 102 may readily be lowered into the interior of cavity 191 of shell 193. Surrounding shell 193 is an outer magnetic cylindrical element 190 welded to shell 193 at 192. At the lower end of cylinder 190, it is welded at 200 to an annular end plate 201 of magnetic material. Plate 201 is centrally apertured so as to accommodate the axially disposed element 104 which has a reentrant portion extending into cavity 191. Element 104 is welded within annulus 201 at 202. The hollow shells 195, 193 and reentrant element 104 are again selected from machinable magnetic materials such as the iron-nickel or chromium types. In this manner, they form a part of the magnetic circuit necessary for true transformer operation, a suitable winding 194 or windings being wound in the cylindrical cavity formed between shells 193 and 190. An external axial extension of element 104 provides mechanical coupling to the base 120 of the lubricant reservoir envelope 101, 120, 121. Further, bores 203, 204, 105 in element 104 permit electrical leads 208 to be coupled between the ends of transformer winding 194 and the instrumentation case 124. The extension 104 is provided with a threaded portion 207 matching interior threads of reentrant part 107 of FIG. 2.

In order to complete the axially symmetric magnetic circuit to be formed by magnetic elements of transformer elements 102 and 103, it has been noted that element 102 is normally inserted within cavity 191 of element 103. For perfecting the magnetic circuit, it is to be noted that the axial core part 164 of device 102 has a generally conical tip 167 at its bottom. The surface of core 167 is generally conformal with a concave conical surface 196 formed in the upper interior end of part 104 of device 103. When element 102 has descended to its normal operating location within element 103, the two conical surfaces are in contact, efficiently completing the magnetic flux path with a gap of minimum thickness. In this manner, the magnetic flux passes, for example, through the inner core 164, the reentrant part of element 104, annulus 201, outer cylinder 190, and back into the top of inner core 164, thereby intercoupling transformer windings 163 and 194.

To aid descent of transformer portion 102 into the cavity 191 of the fixed transformer portion 103, any fluid or foreign matter present in cavity 191 must find ready egress. Such is effected by the branching bores 205, 206 which communicate at the vertex of conical surface 196 with the reservoir 108. Thus, any lubricant, which may be water, and small particulate matter, trapped within cavity 191 as the inner transformer part 102 enters cavity 191, is flushed out of the latter cavity via bores 205, 206 into reservoir 108. It will be understood that the two bores 205, 206 will preferably find themselves in a plane disposed at ninety angular degrees to the plane occupied by the branching bores 203, 204.

Figure 5:
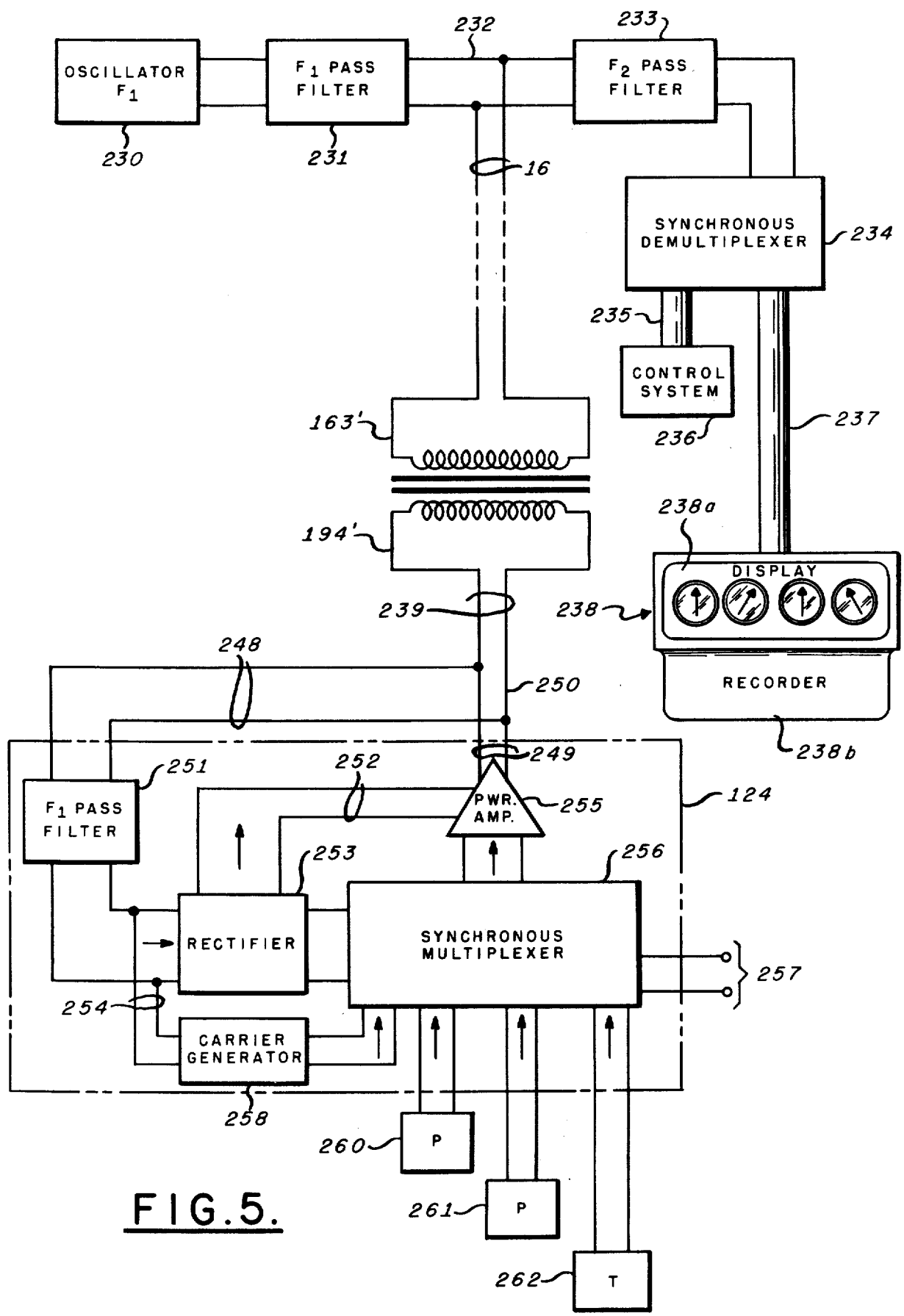
FIG. 5 is a wiring diagram showing electrical features of the apparatus of FIGS. 1 and 2 and illustrating component circuits and their interconnections.
Figure 6:
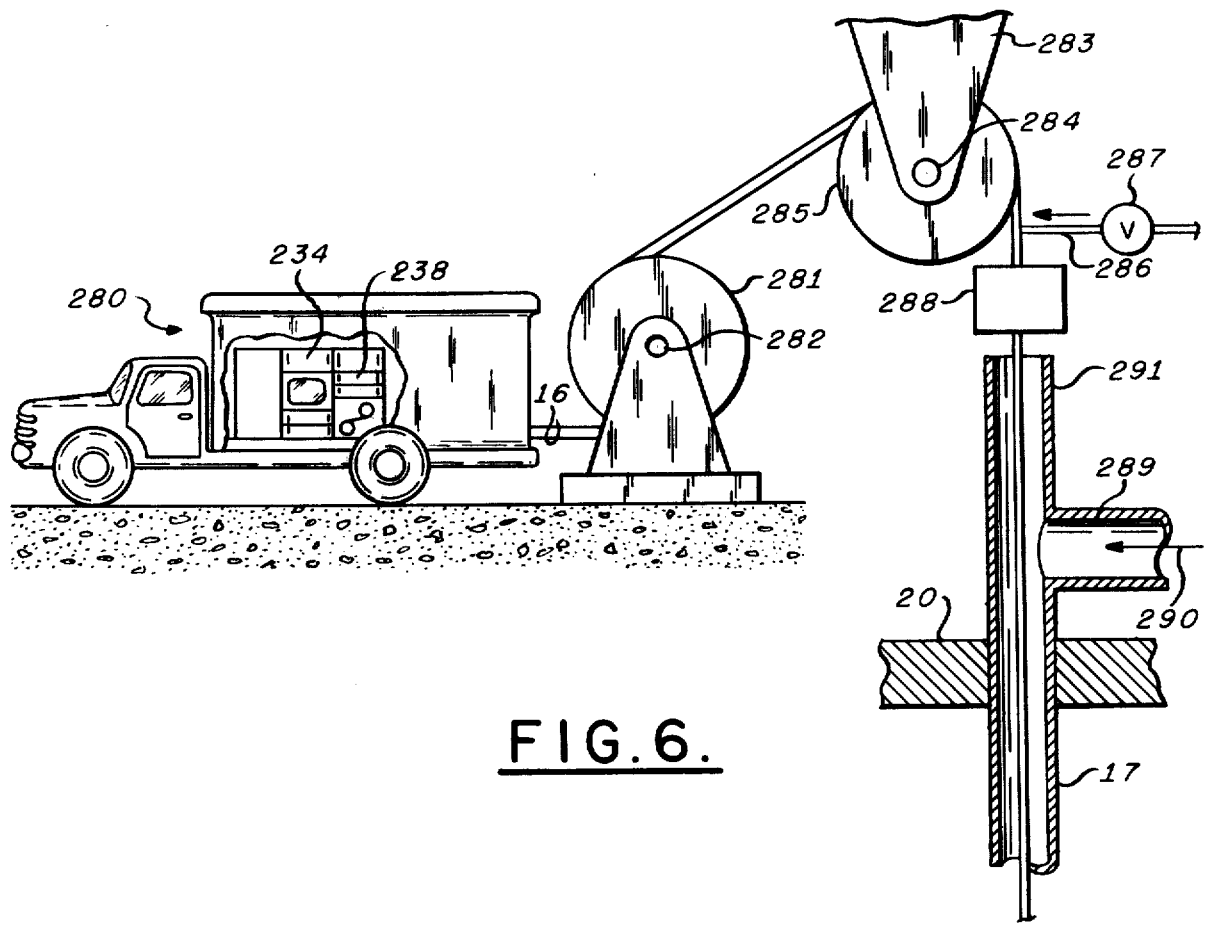
FIG. 6 is an elevation view in partial cross-section, useful in discussing the method of installation of the invention.

FIG. 6 illustrates apparatus used during the final installation of the stainless steel tube 14 and its contained pair of leads 16; the figure shows the movable transformer portion 102 suspended just above the opening into the fixed transformer portion 103. Above the well head plate 20, a branching pipe 289 is coupled to a source (not shown) of a lubricant fluid such as water or an organic liquid under pressure as indicated by arrow 290. Also above the well head plate 20 is a tube branching at tee 286 from the vertical tube 14 and containing a valve 287 for admitting a gas under pressure within tube 14. With transformer portion 102 lowered into its operating position within portion 103 after all of the pump and piping structure is in place and the well is sealed off, packing gland 288 is affixed in its operating position on the upper threaded portion 291 of pipe 17. The relatively large drum reels 281, 285 operated about respective axes 282, 284 by a suitable power drive (not shown) aid in loading tube 14 into the well, and are conventionally disposed elements of many well installation systems. The test van 280 is shown in position, connected by electrical leads 16 to the movable transformer portion 102, and equipped with the power source 230, the demultiplexer 234, and the display equipment 238 of FIG. 5.

Figure 5A:
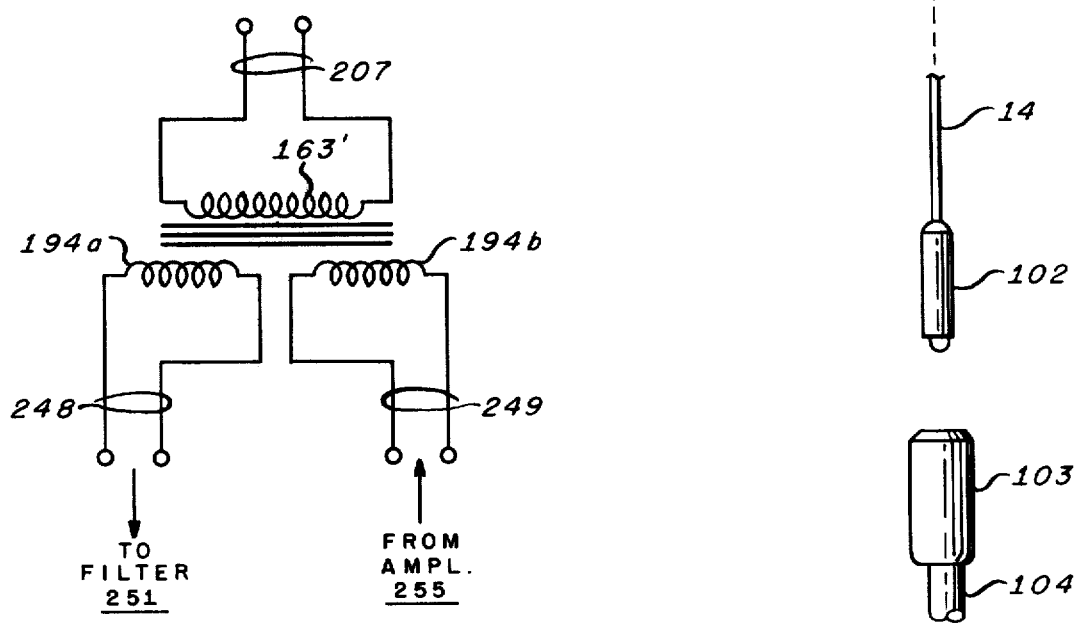
FIG. 5A is a diagram of an alternative form of the transformer shown in FIG. 5.

In the instrumentation system of FIGS. 2, 5 and 6, data representing the operation of turbine motor-pump system is transmitted from electronic circuit envelope 124 via leads 249, separable transformer elements 194', 163', and leads 16 to test van 280; a power source 230 within van 280 supplies alternating power through leads 16, separable transformer elements 163', 194' and leads 239, tee 250, and leads 248 for operating the circuits within envelope 124. In FIG. 5A, it is indicated that the fixed part 194' of the separable transformer may have a pair of individual windings 194a and 194b, winding 194a being coupled to leads 248 and to filter 251, while winding 194b is coupled by leads 249 to the output of amplifier 255. In this manner, the directly coupling tee junction 250 is desirably avoided.

In more detail, power supply or oscillator 230 supplies power at a first frequency $f_1$, say 400 cycles per second, through filter 231 having a narrow passband centered at frequency $f_1$ and thus through tee junction 232 into the pair of leads 16. The $f_1$ signal passes down into the well through transformer elements 163', 194' and tee junction 250 into leads 248. It is accepted by filter 251 also having a narrow passband at $f_1$ for use within envelope 124. For example, it is rectified by rectifier 253 to supply direct voltages to a conventional synchronous multiplexer 256 and to other circuits within envelope 124 such as power amplifier 255, as required.

In this general manner, the signals on output leads 249 of electronic envelope 124 are carrier signals at a carrier frequency $f_2$ of say, 10,000 cycles per second, bearing multiplexed representations of the signals from sensors 257, 260, 261, 262, et cetera. These readily flow through the leads 249, transformer 194', 163', leads 16, and the $f_2$ pass filter 233 into synchronous demultiplexer 234, but desirably not through filters 251 or 231.

Device 234 is a conventional kind of synchronous demultiplexer operated synchronously with respect to the operation of the multiplexer 256 of instrumentation section 65 by virtue of the periodic transmission of a synchronizing signal by the latter and its automatic use by demultiplexer 234. The newly separated signals are then coupled from demultiplexer 234 via cable 237 for presentation in any suitable conventional display 238, as upon individual electrical meters of the meter array 238a. They may additionally or separately be recorded by a conventional multichannel recorder 238b. It will further be understood by those skilled in the art that selected ones of the demultiplexed signals may be used for control purposes as indicated in FIG. 5 wherein they may be selectively supplied by cable 235 to a control or assembly of controls represented by control system 236. By way of example, such signals may be used to operate or to augment the operation of power control apparatus such as described in the aforementioned U.S. Pat. No. 3,824,793.

With further reference to FIG. 5, the signal passed by filter 251 may be coupled via leads 254 to carrier generator 258 for generating the carrier frequency $f_2$ required by synchronous multiplexer 256. Carrier generator 258 may be a conventional frequency multiplier or, alternatively, a stable oscillator excited by the rectified output of rectifier 253'. After synchronous multiplexing, the representations of the signal outputs of sensors 260, 261, 262, and the like are amplified by amplifier 255, if desired, and are directed to the earth's surface via isolation filter amplifier 255 and leads 249 and 16, as before. As noted, signals representing other parameters of the down-well equipment may also be supplied to multiplexer 256, as by input terminals 257, for receipt at the earth's surface.

In order to adjust the geothermal well system at the time of its installation for proper and efficient operation at its site and to monitor its subsequent operation so that safe energy production is efficiently maintained, telemetering of performance information from the geothermal pump to the earth's surface is normally required for control or display purposes. Hot water pressures, temperatures, and pump rotation rate are representative parameters, knowledge of which is valuable for assessing productivity of the apparatus or as control terms. For the sake of simplicity, the measured data is communicated by multiplex transmission to the earth's surface using a channel readily provided after the major part of the deep well system has been installed and not requiring removal unless the entire down-well assembly is to be removed for repair. The invention overcomes difficulties of the prior art, obviating the need for the presence of an electrical generator at the deep well pump site. Continuous monitoring is afforded, whether or not the deep well pump is in actual operation. The separable transformer configuration is particularly advantageous during initial or subsequent installations or removals of the pumping system. The invention provides a simple, compact, and reliable solution to the problem of telemetering operational data to the earth's surface.

While the invention has been described in its preferred embodiments, it is to be understood that the words which have been used are words of description rather than of limitation and that changes within the purview of the appended claims may be made without departure from the true scope and spirit of the invention in its broader aspects.

What is claimed is:

1. In geothermal deep well pumping apparatus located at a subterranean source of geothermal well fluid of the kind including geothermal energy exchange means for providing a working fluid and bearing-supported pump means driven by motor means responsive to said working fluid for pumping said geothermal fluid for flow in cooperative energy exchange relation with respect to said geothermal exchange means toward the earth's surface:
   electrical transformer means having separable first and second inductive portions normally disposed in cooperative energy exchanging relation,
   conduit means extending from the earth's surface for supporting said first inductive portion,
       said conduit means protectively enclosing a two-wire transmission line coupled to said first inductive portion,
   power generator means operating at a first frequency and coupled to said two-wire transmission line,
   utilization means responsive to signals of a second frequency additionally coupled to said two-wire transmission line,
   at least first and second sensor means responsive to respective predetermined first and second characteristics of said geothermal well fluid,
   circuit means responsive to said first and second sensor means for generating multiplexed signals representative of said first and second characteristics at said second frequency,
       said circuit means having input means for receiving said first frequency and output means for transmitting said second frequency both coupled to said second inductive portion whereby said two-wire transmission line and said electrical transformer means supply power at said first frequency to said circuit means and supply said multiplex signals to said utilization means at said second frequency.

2. Apparatus as described in claim 1 further including:
   first pipe means concentrically surrounding said conduit means and said electrical transformer means for forming bearing lubricant reservoir means under pressure,
   means for coupling said bearing lubricant to said bearing-supported pump means.

3. Apparatus as described in claim 1 wherein said utilization means comprises demultiplexer means for separate provision of displays representative of at least said first and second characteristics.

4. Apparatus as described in claim 1 wherein said first inductive portion includes:
   cylindrical internal core means having a first axis,
   first cylindrical coil means wound on said cylindrical internal core means, and first coupling means at one end of said cylindrical internal core means for the coupling thereof to said conduit means.

5. Apparatus as described in claim 4 wherein said second inductive portion includes:

cylindrical shell core means having a second axis, second cylindrical coil means wound within said cylindrical shell core means, and second coupling means at one end of said cylindrical shell core means for fixed support thereof relative to said geothermal deep well pumping apparatus.

6. Apparatus as described in claim 5 wherein:

said first inductive portion is so formed as to be readily inserted into said second inductive portion for completing the closed magnetic circuit of said electrical transformer means, said apparatus further including means for moving said conduit means and said first inductive portion with respect to said second inductive portion with said first and second axes in substantial coincidence.

7. Apparatus as described in claim 2 further including means for maintaining the pressure within said conduit means higher than the pressure within said first pipe means.

8. Monitor means for monitoring the performance of apparatus, said apparatus including motive means at an inaccessible location within a bore hole extending below the earth's surface for performing useful work with respect to a medium at said inaccessible location, said monitor means comprising:

conduit means extending through the earth's surface to said inaccessible location, electrical transformer means having separable first and second inductive portions normally disposed in cooperative energy exchanging relation, said first inductive portion being affixed to said conduit means for suspension thereby, said second inductive portion being supported in fixed relation with respect to said apparatus, power generator means at the earth's surface for coupling alternating power to said first inductive portion, at least first sensor means responsive to a first predetermined characteristic of said medium and disposed adjacent said motive means, circuit means coupled to said second inductive portion and responsive to said alternating power to causing at least said one sensor means to supply to said second inductive portion a data signal representing said first predetermined characteristics, and utilization means at the earth's surface coupled to said first inductive portion for utilizing said data signal.

9. Apparatus as described in claim 8 further including:

at least second sensor means responsive to a second predetermined characteristic of said medium and disposed adjacent said motive means, said circuit means additionally causing said second sensor means to supply to said second inductive portion a data signal representing said second predetermined characteristic, and multiplexer means coupled within said circuit means responsive at least to said first and second sensor means for cooperatively multiplexing said data signals of first and second predetermined characteristics.

10. Apparatus as described in claim 9 additionally including rectifier means responsive to said second inductive portion and to said alternating power for supplying enabling power to said circuit means.

11. Apparatus as described in claim 10 wherein said utilization means coupled to said second inductive portion comprises demultiplexer means for separate provision of at least said data signals of first and second predetermined characteristics to multiple channel utilization means.

12. Apparatus as described in claim 11 wherein said multiple channel utilization means comprises display means.

13. Apparatus as described in claim 1 wherein said multiple channel utilization means comprises multiple channel record storage means.

14. Apparatus as described in claim 10 wherein said utilization means comprises:

demultiplexer means responsive to said data signals, and control means responsive to said demultiplexer means.

15. Apparatus as described in claim 8 further including:

first filter means for passing a power signal frequency coupled in series relation between said power generator means and said first inductive portion, and second filter means for passing said power signal frequency coupled in series relation between said second inductive portion and said circuit means.

16. Apparatus as described in claim 5 further including:

carrier filter means for passing a carrier frequency coupled between said circuit means and said second inductive portion, and carrier filter means for passing said carrier frequency coupled between said first inductive portion and said utilization means.

17. Apparatus as described in claim 16 wherein said circuit means additionally includes carrier frequency generator means responsive to said alternating power for transmission to said utilization means.

18. Apparatus as described in claim 8 wherein said first inductive portion includes:

cylindrical internal core means having a first axis, first coil means wound on said cylindrical core means, and first means at one end of said cylindrical core means for affixing said cylindrical core means to one end of said conduit means.

19. Apparatus as described in claim 18 wherein said second inductive portion includes:

cylindrical shell external core means having a second axis, second coil means wound within said cylindrical shell external core means, and second means at one end of said cylindrical shell external core means for supporting said cylindrical shell external core means in fixed relation with respect to said location.

20. Apparatus as described in claim 19 wherein:

said first inductive portion is so formed as to be readily lowered into said second inductive portion for forming the closed magnetic circuit of said electrical transformer means and is readily removed therefrom, said apparatus further including means for lowering said conduit means and thereby lowering said first inductive portion into said second inductive portion with said first and second axes in substantial coincidence.

21. Apparatus as described in claim 20 further including:
first pipe means concentrically surrounding said conduit means and said electrical transformer means for forming bearing-lubricant reservoir means under pressure,
said moving means being supported for rotation upon bearing means,
means coupling said bearing-lubricant reservoir means to said bearing means for lubricating same.

22. Apparatus as described in claim 21 wherein the outer diameter of said first inductive portion is less than the inner diameter of said first pipe means, permitting said conduit means and said first inductive portion to be raised to the earth's surface.

23. Apparatus as described in claim 9 wherein said first sensor means comprises temperature sensor means.

24. Apparatus as described in claim 23 wherein said second sensor means comprises pressure sensor means.

25. Apparatus as described in claim 21 further including:
second, third and fourth pipe means substantially concentrically surrounding said first pipe means,
pump means at said location for pumping said medium to the earth's surface between said third and fourth pipe means, and
vapor turbine means at said location for driving said pump means in response to vapor flowing between said second and third pipe means heated by said medium pumped to the earth's surface,
said vapor turbine means exhausting said vapor toward the earth's surface between said first and second pipe means,
envelope means enclosing said circuit means within said second pipe means and supported thereby,
said first inductive means being supported upon said envelope means.

* * * * *